Patented July 25, 1933

1,919,310

UNITED STATES PATENT OFFICE

ROBERT SUCHY AND HANS FRIEDRICH ALFRED EMIL KRAUSE, OF BITTERFELD, GERMANY, ASSIGNORS TO I. G. FARBENINDUSTRIE AKTIENGESELLSCHAFT, OF FRANKFORT-ON-THE-MAIN, GERMANY

PROCESS FOR THE SIMULTANEOUS PRODUCTION OF PHOSPHORUS AND ALUMINA

No Drawing. Application filed August 4, 1930, Serial No. 473,121, and in Germany September 4, 1929.

The present invention relates to a process of producing phosphorus or phosphoric acid and alumina.

According to the invention, a charge comprising natural aluminium phosphate, a sulfide or sulfides preferably sulfidic ores, and a reducing agent, preferably coke, is introduced into an electrically heated furnace such as is generally employed for the volatilization of phosphorus or phosphoric acid from raw phosphates, and is molten therein. The proportions of the components of the charge are selected in such a manner that the alumina liberated by decomposition of the aluminium phosphate is dissolved in the aluminium sulfide which results from the double decomposition of the sulfidic ores. When practically all the phosphorus is volatilized in the elementary state the melt consisting of alumina, dissolved in aluminium sulfide, is tapped from the furnace and worked up into alumina in the manner well known per se.

It has already been proposed to decompose mineral aluminium phosphates by a simple heating, preferably in the presence of minor quantities of carbon, so as to obtain phosphoric acid and impure alumina. On the other hand, it was hitherto generally supposed that the presence of a basic body such as lime combining with the alumina would be necessary in order to completely decompose the aluminium phosphate, particularly when the simultaneous reduction of the phosphate radical to elementary phosphorus is contemplated. In spite of this general expectation it has been ascertained that complete decomposition of aluminium phosphate is possible also in the absence of a basic body. This observation was particularly significant for the present invention inasmuch as the practically complete elimination of the phosphorus from the resulting melt is an essential condition for obtaining pure alumina in the manner described.

On the other hand, it is known to produce pure alumina from aluminous raw materials, particularly bauxite, by melting a mixture of said raw materials with sulfides under reducing conditions and working up the melt containing alumina and aluminium sulfide into pure alumina. When applying a similar principle to the recovery of pure alumina from aluminium phosphates, however, it was almost certainly to be expected that at least part of the phosphorus would combine with the sulfur radical of the heavy metal sulfides employed. Such a reaction, however, would cause a substantial reduction of the amount of aluminium sulfide produced in the course of the process, which is required as a solvent for the alumina produced. Contrary to all expectations it has now been ascertained that at least at the high temperatures required in the process according to the invention only an entirely negligible percentage of the heavy metal is displaced by phosphorus instead of by alumina in the starting sulfidic compound and is thus volatilized in the form of $P_2S_5$. The technical and economical advantage secured by the present invention thus resides in that it is possible to recover phosphorus simultaneously with pure alumina by replacing the bauxite hitherto employed by aluminum phosphate. The phosphorus volatilized is recovered in the known manner by condensation of the elementary phosphorus issuing from the furnace. However, if desired, it may also be immediately converted into phosphoric acid by combustion with air or steam. By virtue of the addition of sulfides, particularly heavy metal sulfides, to the charge consisting of aluminium phosphate and a reducing agent there are obtained a melt of alumina and aluminium sulfide and further a metal alloy containing the elements of the phosphate gangue (Si, Ti, etc.) which are both separately tapped from the furnace.

When carrying out the present invention we preferably proceed as follows:

A mixture of preferably dehydrated aluminium phosphate, coke and iron sulfide is subjected to a melting process in a closed furnace at a temperature of about 1600–1700° C., the quantity of the coke being sufficient to reduce all the components of the charge with the exception of the alumina base contained in the raw phosphate, and the quantity of iron sulfide being sufficient for converting a minor part of the alumina into aluminium sulfide. The titanium and the silicon reduced from the gangue form an alloy with the iron, this alloy further combining with comparatively negligible amounts of phosphorus, which vary somewhat according to the proportions of the remaining components of the alloy. The aluminium sulfide simultaneously formed dissolves the alumina resulting from the decomposition of the aluminium phosphate while forming a melt. When the phosphorus is completely volatilized the aluminous melt is tapped from the furnace and allowed to cool, whereupon alumina crystallizes. On the other hand, an iron alloy containing Ti, Si and P is recovered.

Example

Aluminium phosphate having the following composition

|  | Percent |
|---|---|
| $Al_2O_3$ | 36.5 |
| $P_2O_5$ | 42.7 |
| $Fe_2O_3$ | 7.9 |
| $TiO_2$ | 3.3 |
| $SiO_2$ | 0.9 | is melted together with coke and pyrite ore, the proportions being

|  | Parts by weight |
|---|---|
| Aluminium phosphate | 100 |
| Pyrite ore | 70 |
| Coke | 25 |

The quantity of coke which is present is sufficient to reduce not only the phosphorus pentoxide resulting from the decomposition of the phosphate but also the silica, titanic oxide, and iron oxide present in the gangue. About 25 percent of the alumina present are converted into aluminium sulfide, the latter dissolving the remaining 75 percent of alumina. During the melting process, phosphorus and carbon monoxide are volatilized. On tapping the furnace there are obtained an iron alloy containing the elements of the gangue and a melt of alumina and aluminium sulfide which is worked up into pure alumina in the manner known per se.

We claim:

1. A process which comprises the step of melting together a natural aluminium phosphate and iron sulfide in the presence of carbon, the quantity of the carbon and the temperature maintained in the melting process being sufficient to ensure complete reduction of the phosphorus oxide contained in the phosphate and of the compounds constituting the gangue, and the quantity of the sulfide being sufficient to convert about 25 percent of the alumina contained in the phosphate into aluminium sulfide.

2. A process which comprises the steps of melting together 100 parts of natural aluminium phosphate, about 70 parts of pyrite ore, and about 25 parts of coke at between about 1600 and 1700° C., separately tapping an iron alloy containing the compounds constituting the gangue of the phosphate in reduced form, and a melt consisting of about 75 percent by weight of alumina dissolved in about 25 percent by weight of aluminium sulfide, and recovering aluminium oxide from said solution.

ROBERT SUCHY.
HANS FRIEDRICH ALFRED EMIL KRAUSE.